June 27, 1972  L. E. PEARSON  3,673,028
GLASS FIBER CONTAINER AND METHOD OF CONSTRUCTION
Filed Oct. 1, 1969  2 Sheets-Sheet 2

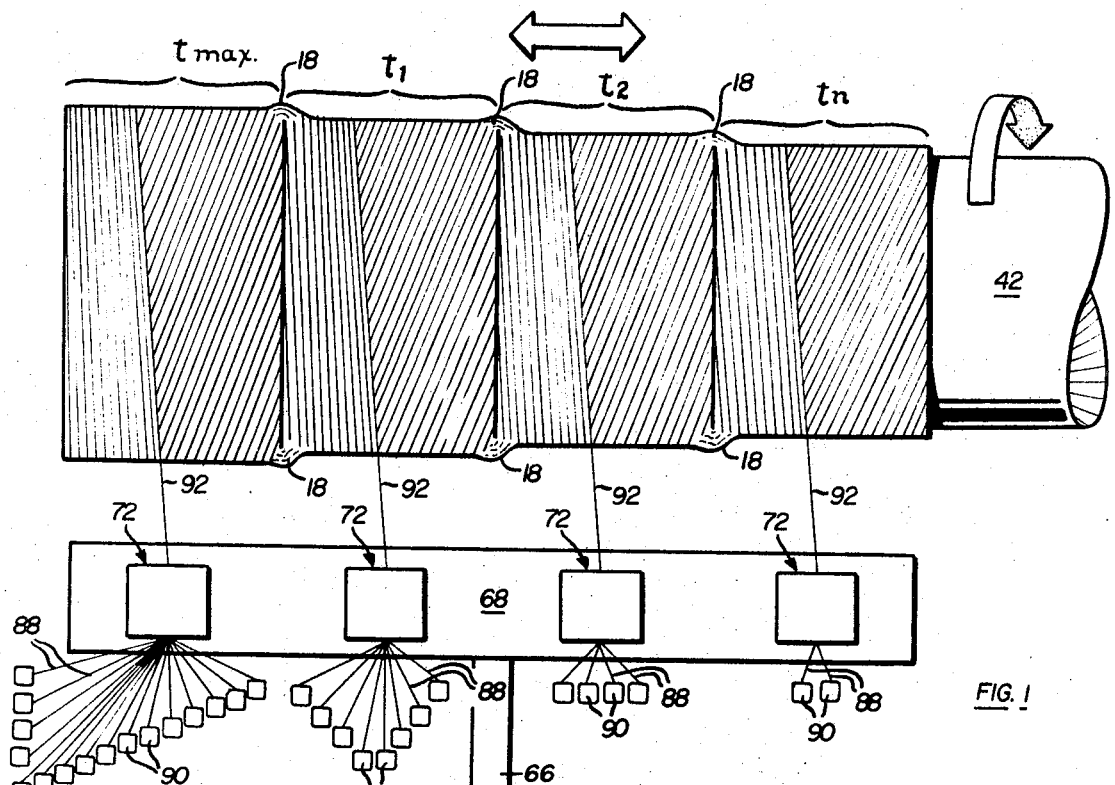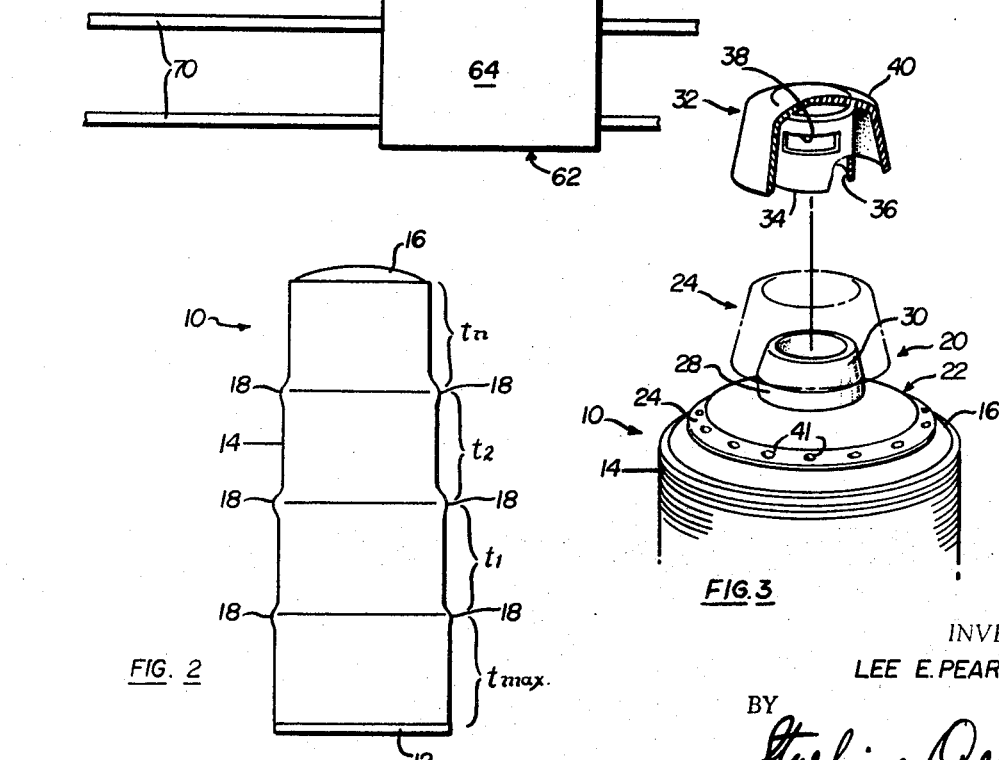

INVENTOR
LEE E. PEARSON.
BY
ATT'Y.S.

3,673,028
GLASS FIBER CONTAINER AND METHOD
OF CONSTRUCTION
Lee E. Pearson, Granville, Ohio, assignor to Owens-Corning Fiberglas Corporation, Toledo, Ohio
Filed Oct. 1, 1969, Ser. No. 862,727
Int. Cl. B31c 9/00, 13/00
U.S. Cl. 156—172
3 Claims

ABSTRACT OF THE DISCLOSURE

A filament-wound glass fiber container of a hollow tubular configuration having a wall composed of a plurality of discontinuous axially overlapping sections integrated with one another at the areas of overlap to form a homogeneous monolithic body. Also disclosed is a method of producing the container. The method includes the steps of simultaneously winding a plurality of spaced apart axially aligned groups of resin saturated glass fiber strands on a core, each group being wound in partially overlapping relation to the group or groups immediately adjacent to it and forming a predetermined section of the wall of the container. Thereafter the resin is cured.

BACKGROUND OF THE INVENTION

Field of the invention

This invention relates to glass fiber containers which are manufactured in part or in whole by winding resin-coated continuous filaments of glass fibers strands or rovings about a revolving mandrel or core. The filament winding process is now broadly used for producing containers and the like of a substantial variety, and involves the following steps:

(1) Winding a continuous glass fiber strand saturated with a hardenable, liquid resin on a core. This provides a wet shell overlay;

(2) Thereafter, the resin is polymerized or hardened or cured to fix the shape of the overlay; and (3) Then the core is removed by suitable means.

In the event a tube-like structure is being produced, the core can be collapsed or by means of suitable release agents slidably removed coaxially from an end of the tubular overlay. In the event a completely enclosed shell has been made, a water-soluble core will have been used and this is removed as by dissolving.

Cores of other materials such as low melting resins and metals can also be used. These softenable materials can be removed by melting. Others can be removed by breakage; for example, plaster.

From the foregoing, it will be evident that by attachment of suitable closures, pressure vessels can be produced. These products are characterized by an extremely high strength-to-weight ratio.

Still further, such structures provide an ideal environment for continuous glass fibers, because of the superior properties of such fibers in tension. In filament-wound structures, the resin holds the fibers in position to immediately assume load without elongation, and thus the matrix resin is subjected to little if any load before the glass fibers take the load or become effective.

Containers made by the above-described method are particularly suited for storage of chemicals and other liquids because of their strength and relative inertness to chemical attack. They are considerably lighter in weight than the metal tanks which have conventionally been used for this purpose.

The prior art

In a conventional cylindrical container the thickness of the wall is determined by the static pressure on the wall at the lowermost level in the container. The filament-wound glass fiber containers of the prior art have conventionally been produced by winding resin-saturated continuous glass fiber strands obtained from a single winding pot on a revolving mandrel or core. The winding pot is mounted in a carriage which traverses the length of the core. The conventional method produces a container having a wall thickness that is the same throughout the height of the container. Since static pressure decreases as the top of a liquid column is approached, it is obvious that the thickness of the upper wall of the container does not need to be as great as the thickness of the lower wall. Conventional containers designed to withstand the maximum pressure at the bottom of the wall and which have the same wall thickness throughout, have, therefore, an excess of material in the upper walls.

The optimum design would be a lineal taper from a relatively thick lower wall to a relatively thin upper wall. This would require elaborate and expensive continuously differentiating winding equipment.

A method has now been found to manufacture a filament-wound glass fiber container having a wall thickness which increases in discrete axial increments from the uppermost to the lowermost section of the wall, and which approximates the optimum lineal taper above-mentioned, yet which does not require expensive differentiating winding equipment.

It is an object of this invention to provide a filament-wound glass fiber container of a hollow tubular configuration having a wall composed of a plurality of discontinuous axially overlapping sections integrated with one another at the areas of overlap to form a homogeneous monolithic body.

It is a further object of this invention to provide a filament-wound glass fiber container of a hollow tubular configuration in which the wall is of axial incrementally increasing thickness from the uppermost to the lowermost sections thereof.

It is another object of this invention to provide a filament-wound glass fiber container of a hollow tubular configuration having a wall of axial incrementally increasing thickness from the uppermost to the lowermost sections thereof and which has a combiend manway lid and vent located at the top of the container.

It is a still further object of the invention to provide a method of producing a filament-wound glass fiber container of a hollow tubular configuration having a wall composed of a plurality of discontinuous axially overlapping sections integrated with one another at the areas of overlap to form a homogeneous monolithic body.

It is yet another object of the invention to provide a method of producing a filament-wound glass fiber container of a hollow tubular configuration having a wall of axial incrementally increasing thickness from the uppermost to the lowermost sections thereof.

Other objects of this invention will appear in the following description and appended claims, reference being had to the accompanying drawings forming a part of this specification wherein like reference characters designate corresponding parts in the several views.

FIG. 1 is a somewhat schematic plan view of the container of the invention being wound.

FIG. 2 is a side elevational view of the container of the invention.

FIG. 3 is a perspective view of the top of a preferred embodiment of the container of the invention illustrating the combined manway lid and event in greater detail.

DESCRIPTION OF THE PREFERRED EMBODIMENT

Figure 4:
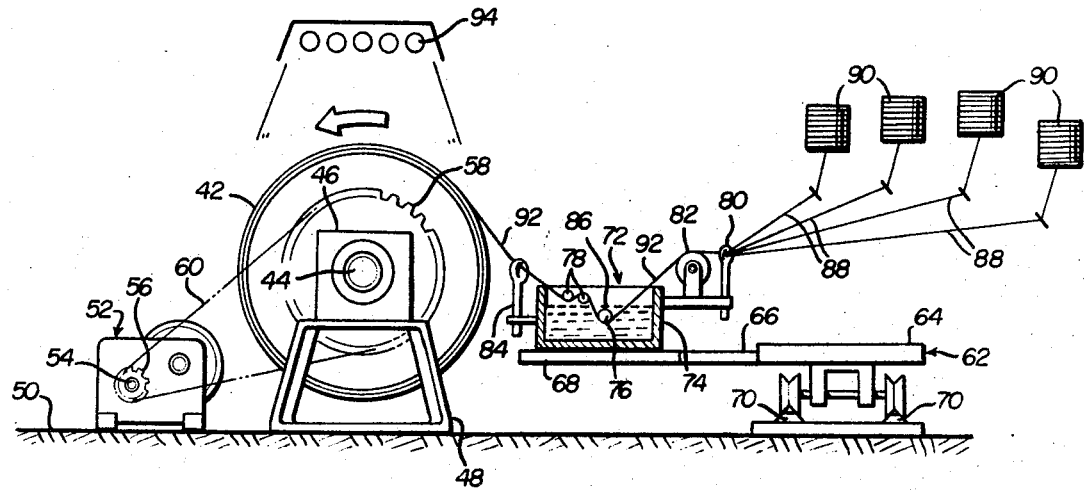
FIG. 4 is a side elevational view of apparatus for producing the filament-wound container of the invention.
Figure 6:
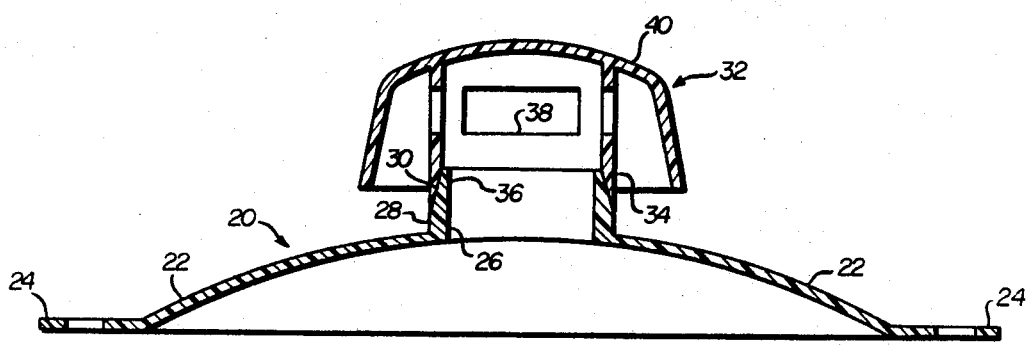
FIG. 6 is a cross-sectional view of the combined manway lid and vent.

A container 10 made in accordance with the method of the invention is shown in FIG. 2. The container 10 comprises a glass fiber reinforced base end cap 12 and a continuous filament-wound glass fiber side wall 14 comprised of sections of varying thickness, designated $t_{max}$, $t_1$, $t_2$, and $t_n$. A glass fiber reinforced top end cap 16 is optionally attached to the top of the side wall 14. The uppermost section of the wall $t_n$, is the section of least wall thickness. The thickness of the rest of the sections is incrementally increased axially as the lowermost section, $t_{max}$, is approached. The thickness of the various sections of the wall is directly dependant upon the number of strands of glass fiber contained in the respective group of strands used in the formation of the individual sections. The larger the number of strands in a group, the thicker the wall section will be relative to the other sections. A joint 18 is formed at the point of overlap of the various sections.

The base and top end caps 12 and 16, respectively, are made of chopped strand fiber glass reinforced resin, and can be produced by a spray lay-up technique, as described herein.

In a preferred embodiment (see FIG. 3) the top end cap 16 has a hole or manway (not shown) cut into it, so that access can be gained to the interior of the container 10 for cleaning and the like.

A combined manway lid and vent 20 is attached to a flange (not shown) mounted on the end cap 16 and surrounding the manway in the end can 16.

The combined manway lid and vent 20 comprises a curved base section 22 having an outwardly projecting flange 24 on its lower edge, and an orifice 26 in the top. A cylinder 28 having an inwardly tapered upper outer wall 30 extends from the upper surface of the base section 22 surrounding the orifice 26.

A vent cap 32 is fitted over the cylinder 28 of the base section 22. The vent cap 32 comprises a cylinder 34 having an outwardly tapered lower inner wall 36, and a plurality of vents 38 cut in it. A cover 40 is attached to the top of the cylinder 34 and curves down the sides of the cylinder 34 to a level below that at which the vents 38 are located.

The outer diameter of the cylinder 28 and the inner diameter of the cylinder 34 are such that the tapered wall 30 of the cylinder 28 and the tapered wall 36 of the cylinder 34 approximate each other and fit in sliding relationship. The cylinder 34 is flexible, thus it has considerable give when it is pressed onto the cylinder 28. A tight fit is thus assured. Desirably the base section 22 and vent cap 32 of the combined manway lid and vent 20 are made of molded glass fiber reinforced resin. The manway lid and vent 20 is attached to the top end cap 16 by bolts 41. The combined manway lid and vent 20 prevents rain and other contaminants from entering into the container 10 yet allows easy access to the interior of the container 10 to clean it, when the combined manway lid and vent 20 is removed.

The method of making the container 10 of the invention will now be described.

In FIGS. 1 and 4, filament winding apparatus for producing a part such as a cylindrical vessel is illustrated. This apparatus includes a large rotatable mandrel 42, in this instance being shown as a cylindrical body, mounted upon a shaft 44. The shaft 44 is carried in bearings 46 mounted at the top ends of supports 48. Ground level or floor level is indicated at 50.

A gear reduction drive motor 52 having a shaft 54 extending from the forward end thereof is mounted adjacent to the mandrel 42. A drive sprocket 56 is attached to the shaft 54. A larger driven sprocket 58 is mounted on the shaft 44 supporting the mandrel 42, adjacent to bearings 46 and in alignment with the drive sprocket 56. Chain 60 laps sprockets 56 and 58 in driving relation.

According to the setting of the gear reduction motor unit 52, the speed of rotation of the mandrel 42 is thereby established.

A traversing carriage 62 comprising a base 64, an arm 66 extending from the side of the base adjacent the mandrel 42, and a support element 68 mounted on the end of the arm 66 parallel to the mandrel 42, operates back and forth on tracks 70 mounted parallel to the axis of the mandrel 42. A plurality of equidistantly spaced winding pots 72 rest on the support element 68 of the carriage 62. Each winding pot 72 comprises a pan 74, a dip roll 76, and wiper bars 78 horizontally mounted in the pan 74, an eye 80 and a guide roll 82 mounted on the side of the pan 74 opposite the mandrel 42 and an eye 84 mounted on the side of the pan 74 adjacent the mandrel 42. The pan 74 contains a body of liquid resin 86.

Filament-wound layers of glass fibers are applied as shown in FIG. 1. A plurality of strands 88 made of continuous glass fibers, are fed from suitably located packages 90 into the eye 80 and guide roll 82 mounted on each pan 74 which draws them together into groups 92. Each group 92 is then led under the dip rolls 76 to be immersed in the liquid resin 86. As the wet groups 92 then pass between the wiper bars 78, the amount of resin is reduced to a desirable level. The individual groups 92 are then passed through the eye 84 attached to each pan 74 and onto the mandrel 42.

As the mandrel 42 is turned, the traversing carriage 62 is moved equidistantly to and fro parallel to the axis of the mandrel 42. This is effective to lay the wetted groups of strands 92 on the outer surface of the mandrel as shown in FIG. 1. Note the slight angular, or back and forth lay of the groups 88 in FIG. 1. A suitable angle is 80° relative to the axis of the mandrel 42. The angle is not critical, however.

Due to the traverse of the wetted groups 92 back and forth over the mandrel 42, the orientation of the groups 92 is both axial and peripheral. This imparts strength in both axial and peripheral directions to the container. Additionally, the criss-cross lay of the groups 92 produces a very high strength shell structure, stress-resistant in all directions.

Figure 5:
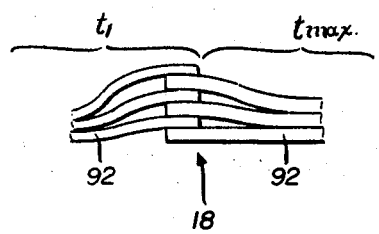
FIG. 5 is a schematic representation of the overlap of two adjacent sections of the container wall.

As best seen in FIG. 5, the areas where two wall sections meet ($t_{max}$, $t_1$, or any other two) have alternately overlapping layers of groups 92 of strands 88 forming the slightly raised joint 18. This interdigitation of layers provides a strong reinforcing bond between the various wall sections, producing a homogeneous monolithic body when the resin is cured. The overlapping is achieved by spacing the winding pots 72 apart, a distance less than the distance traversed by the carriage 62 in one direction. Preferably, the adjacent layers overlap each other by about 10% of the total distance of the traverse.

It should be understood at this point, that the groups 92 for the filament winding operation shown in FIG. 1 are not in a condition that can actually be called "tension." The condition is more aptly described as "oriented." Thus, the continuous groups 92 are applied with just enough drag by the wiper bars 78 in the resin pans 74 to "lay them on." This is sufficient to expel entrained gases and render the structure monolithic in character. Further, the groups 92 are ready to instantly assume load, but do not impart a prestressed condition to the cylindrical body.

It should be noted at this point that impregnation of the groups 92 of strands 88 as here described is exemplary and that other means can be employed.

It is preferred that the group 92 of strands 88 being wound on the mandrel 42 to form the lowermost section, $t_{max}$, of the wall 14 of the container 10 will contain approximately 120 individual strands. Each strand 88 contains about 200 glass fiber filaments. Each successive group 92 sequentially removed from the group forming the lowermost section of the wall will contain fewer strands 88. The group 92 forming the uppermost or thinnest section, $t_n$, of the wall 14 will contain about 30 strands. It should be appreciated that these figures are only relative and that modifications can be made in the made in the number of strands 88 in each group 92 and the number of groups 92 used to achieve a container 10 with the desired variations in wall thickness.

While the method of the invention has been described in terms of the production of a container wall having an incrementally increased wall thickness, it is equally applicable to the production of a container in which the wall thickness is constant. Thus each group 92 of glass fiber strands 88 can contain the same number of strands 88 rather than a different number of strands. The use of a plurality of groups 92 of glass fiber strands 88 to form overlapping sections of a wall simultaneously enables a filament-wound container to be produced much faster than by the techniques of the prior art, using only a single winding pot.

The manner in which the end caps 12 and 16 are made and joined to the tubular side wall 14 will now be described in detail.

A metal mandrel is utilized for laying up the end caps 12 and 16. The mandrel has an appropriate contour to shape the end caps. A layer of release agent is first applied from a gun to the outer surface of the mandrel. The release agent is suitably a wax or other substance to aid in removing the finished part from the polished surface of the mandrel.

A layer of surfacing mat is next applied to hold a resin-rich surface on the inside of the end caps 12 or 16.

Next, a layer of liquid resin and chopped strand reinforcement is applied by suitable means. One exemplary means for applying the chopped strand-resin layer comprises a gun that chops continuous glass fiber strand and propels the chopped pieces toward the exterior surface of the mandrel. Simultaneously a gun applies a surrounding mist of resin. The resin wets the chopped strand and together with the chopped strand, builds up the layer over the surface mat on the mandrel.

Also, an optional layer of surface mat can be applied on the outside in order to hold a resin-rich surface on the outside.

The resin applied by the gun contains the catalyst. The resin is, therefore, self-curing.

Removal of the part from the mandrel is suitably affected by lifting off. If desired, an assist from a jet of air, introduced by a built-in conduit can be used.

The afore-described process produces a cap 12 or 16 that will fit onto the end of the forming mandrel 42 (FIG. 1 or 4) used in making the endless tubular side wall 14 of FIGS. 1 and 2.

The shaft 44 of the mandrel 42 is cantilevered so that the left end of the mandrel 42 is exposed for application of the end cap 12 or 16.

The end cap 12 or 16 is held in position at the end of the mandrel 42 by means of a dead-center mechanism. The dead-center mechanism is held in place by any suitable means. For example, a clamp can be used to hold a leg of the mechanism to an angle iron fastened to the floor.

A dead-center mechanism includes a rotatable shaft having a rubber pad at one end, which abuts the end cap 12 or 16. A spring urges the shaft in a direction to force the rubber pad against the end cap 12 or 16 and firmly holds the end cap in position on the end of the mandrel 42.

A layer of wall 14, FIG. 1, has been applied to cover the surface of the mandrel 42 and is coupled with the end cap 12 or 16 during the process. The coupling can be achieved by either bonding the end cap to the cylinder with a resin saturated glass fiber fabric, or by laying down layers of resin saturated groups of strands over cowls on the end caps. Methods of bonding the end caps onto the side wall are known by those skilled in the art and form no part of the invention. Specific techniques are described in U.S. Pats. Nos. 3,412,891 and 3,394,841, and French Pat. No. 1,456,663.

After the groups 92 of strands 88 have been wound around the core or mandrel 42 and the end caps 12 or 16 have been attached, the entire wet lay-up is cured by heat generated from an infrared source, designated 94. The mandrel 42 is rotated slowly during the curing step. The external radiants 94 direct their rays through the wet lay-up and these are then reflected back from the surface of the mandrel. All portions of the resin are therefore activated effectively by the exterior type of energy application.

At the end of the curing step a monolithic structure has been produced having laminated alternate layers at each overlapped joint, forming a strong reinforcing bond.

The following example illustrates the method of the invention.

EXAMPLE 1

Six winding pots were mounted on a support element of a carriage mounted on tracks running parallel to the long axis of a mandrel coated with a release agent. The pots were equidistantly spaced apart.

A group of about 120 strands of continuous glass fibers was fed into the first winding pot, a group of about 105 strands into the second, a group of about 90 strands into the third, a group of about 75 strands into the fourth, a group of about 60 strands into the fifth, and a group of about 45 strands into the sixth. Each of the strands contained the same number of glass filaments.

Each group was coated with a thermosetting resin in the winding pot, and then positioned on the outer surface of the mandrel at a predetermined point, separated from the adjacent groups.

As the mandrel was revolved, the carriage upon which the winding pots were mounted was moved to and fro parallel to the axis of the mandrel, laying the wetted groups of strands on the outer surface of the mandrel, each group overlapping by about 3 inches the layer lain down by the group next adjacent to it, as the limits of the traverse in each direction were approached.

A cylindrical wall section of varying thickness was built up in which the wall section built up with the group of strands from the first winding pot was thickest, while that section built up with the group of strands from the sixth winding pot was least thick.

After the desired thickness was reached, and the resin cured, the monolithic cylinder thus formed was removed from the mandrel and end caps attached in a conventional manner, forming a complete container.

The resin materials for use in the invention broadly include hardenable resins such as thermosetting materials; these include epoxies, polyesters, modified acrylic systems, phenolics, polyurethanes, and the like. It is believed that these are sufficiently well-known materials that further elaboration on the chemical aspects thereof is not necessary. They are all listed in technical books and journals of the present art, and reference is made thereto for further and more specific identification. The resins preferably contain catalysts so that they are self-curing. Still further, inorganic cements could be used. These would include the materials that hydrate to the solid state, usch as portland cement, plaster of Paris, etc.

The glass strands 88 are made up of a plurality, usually 200 or more in number, of continuous glass fibers gathered into strand form and held together by an abrasion-resistant coating or binder for integrity of the strand.

"Filament-wound" as used herein includes the use of tapes as well as strands as the winding medium. Further, rovings are to be included; a roving comprises a plurality of strands in parallel association as a loose cord or ropy structure.

The mandrel 42 can be a cylindrical body of metal, and inflatable rubber bag, or a body of water-soluble salt or the like. In the case of metal, wood, or the like, it may be necessary or desirable to apply a mold-release agent to the outer surface to permit release of the finished part therefrom after curing the resin. This may be particularly necessary when epoxy resins are being used as they are very tenacious materials when cured and have a tendency to stick to most any surface.

While it is preferred to form the side wall 14 of the container 10 of this invention with a smooth surfaced mandrel 42, it can be appreciated that the method of forming the side wall 14 can be used using a stepped mandrel. When a stepped mandrel is used the exterior of the finished side wall 14 is smooth while the interior wall is of the complementary shape of the mandrel.

If the side wall 14 is to be removed from the mandrel 42, leaving the mandrel 42 intact, the mandrel 42 preferably has a slight taper (½°) to facilitate easy removal of the side wall 14.

In a preferred embodiment, the core upon which the groups 92 of glass fiber strands 88 are wound is a partially produced glass fiber cylinder built up of various layers of resin and chopped glass fiber strands covering a mandrel. The continuous groups of strands are wound around this preform or partially completed container for reinforcing purposes. A container comprising various layers of resin and glass fiber cloth or chopped strands bonded with resin is described in U.S. patent application Ser. No. 616,088 and U.S. Pat. No. 3,338,271.

The wall thicknesses of glass fiber tanks made in accordance with the herein described method in general range from 3/16 to ½ inch, and the length of the tanks range from about 5 to about 15 feet. In some instances it may be necessary or desirable to join two or more wall sections end to end to achieve the desired length. When this is desired the wall sections are wound separately on a mandrel, then they are joined together end to end and cemented together by wrapping resin saturated glass fiber tape around the joint. The resin is then cured.

I claim:
1. A method of producing a filament-wound glass fiber container of hollow tubular configuration, the wall thickness of which incrementally increases in discrete steps from the top to the bottom of the wall, comprising (1) saturating a plurality of individual groups of glass fiber strands with resin by passing each group through a separate container filled with resin, (2) simultaneously winding the plurality of groups of resin saturated glass fiber strands on a core, each group being wound in partially overlapping relation to the group or groups immediately adjacent to it and forming a predetermined section of the wall, the group forming the lowermost section of the wall containing the greatest number of strands and each succeeding group adjacent thereto containing a proportionally lesser amount of strands, and (3) curing the resin.

2. In a method of making a storage tank or the like by winding on a rotatable core a plurality of strands of glass fiber impregnated with a curable liquid resin, the steps of subdividing the axial extent of the core into a plurality of axially limited coaxial sections, simultaneously and separately traversing each such zone with an individual group of resin impregnated glass fiber strands as the core rotates to helically wind that group of strands throughout the entire axial extent of each such section plus the adjacent marginal portion of the next axially adjacent section, thereby forming a composite, continuous annular tank body containing discontinuous, axially overlapping sections, and finally curing the annular tank body to integrate said sections with one another and to form a homogeneous monolithic body.

3. A method of producing a filament-wound glass fiber container of hollow tubular configuration, comprising:
simultaneously winding a plurality of spaced apart groups of resin saturated glass fibers on a core, each group being wound in partially overlapping relation to the group or groups immediately adjacent to it and forming a predetermined section of the wall, wherein the group forming the section of the wall at one end of the container contains the greatest number of fibers and each succeeding group adjacent thereto contains a proportionally lesser number of fibers; and curing the resin to integrate said sections and form a monolithic body.

References Cited
UNITED STATES PATENTS

| | | | |
|---|---|---|---|
| 3,203,845 | 8/1965 | Short | 220—83 |
| 3,068,134 | 12/1962 | Cilker et al. | 156—178 |
| 3,367,656 | 2/1968 | Medney | 156—172 |
| 3,135,639 | 6/1964 | Bilodeau | 156—172 |
| 3,394,841 | 7/1968 | Anderson | 220—83 |
| 3,412,891 | 11/1968 | Bastone et al. | 220—83 |

CARL D. QUARFORTH, Primary Examiner
E. E. LEHMANN, Assistant Examiner

U.S. Cl. X.R.
156—173, 175; 220—3, 5